June 25, 1963 C. H. KLEIN 3,095,468

SPLICE SEPARATOR

Filed May 31, 1960 6 Sheets-Sheet 1

INVENTOR.
CHARLES H. KLEIN
BY Woodling & Krost
ATTORNEYS

June 25, 1963 C. H. KLEIN 3,095,468

SPLICE SEPARATOR

Filed May 31, 1960 6 Sheets-Sheet 2

INVENTOR.
CHARLES H. KLEIN
BY Woodling & Krost
ATTORNEYS

SPLICE SEPARATOR

Filed May 31, 1960 6 Sheets-Sheet 3

INVENTOR.
CHARLES H. KLEIN
BY Woodling & Krost
ATTORNEYS

SPLICE SEPARATOR

Filed May 31, 1960 6 Sheets-Sheet 4

INVENTOR.
CHARLES H. KLEIN
BY Woodling + Krost
ATTORNEYS

SPLICE SEPARATOR

Filed May 31, 1960

INVENTOR.
CHARLES H. KLEIN
BY Woodling & Krost
ATTORNEYS

INVENTOR.
CHARLES H. KLEIN
BY Woodling & Krost
ATTORNEYS

United States Patent Office 3,095,468

Patented June 25, 1963

3,095,468

SPLICE SEPARATOR

Charles H. Klein, Cleveland, Ohio, assignor to The National Telephone Supply Company Filed May 31, 1960, Ser. No. 32,972
2 Claims. (Cl. 174—88)

The invention relates in general to a splice separator made of insulating material for separating conductors at a cable joint.

In the splicing of plural wire cable the wires where spliced must be insulated from each other. Where tape is used exclusively, a very bulky splice results and it is quite difficult to wrap the tape completely around the wire since the other wires are in the way. To get away from this bulky splice, the method of staggering the wire splices has been resorted to for years. This method has the disadvantage that both wires must be cut exactly alike or one will get the whole tensile load and will break.

As another means of getting away from the bulky splice, while still omitting the staggering, it has been proposed to use a very thin tape. This is still troublesome taping the second splice since the fresh tape sticks to that of the first splice each time a wrap is made. Where it has been proposed to utilize elastic members having grooves on the surface to receive the conductors which members extend the entire length between the cable insulation, a very serious problem has been encountered in bending and reverse bending the conductors or wires in getting the members and wires into place.

With the use of the insulated splice separator of the present invention it is not necessary to tape the individually spliced wires nor is it necessary to stagger the splices to obviate a bulky splice. There is also no trouble in getting the splice separator into place between wires and no trouble is encountered with bending and reverse bending of the wires.

An object of the invention is to provide a new and novel splice separator for insulating conductors from each other.

Another object of the invention is to provide a new cable splice and a method of making the same.

Another object of the invention is to provide a generally wedge shaped splice separator member made of substantially rigid plastic material. The use of the words "substantially rigid" is meant to include those materials in the range of from semi rigid to rigid materials.

Another object of the invention is to provide a splice separator which acts as a splint for conductors which are joined by sleeve members since it is longer than the sleeves and which is shorter than the distance between the removed cable insulation.

Another object of the invention is to provide a splice with a splice separator having detent surfaces which have entrance portions large enough to receive sleeve members and/or insulation around conductors or wires without the necessity of externally urging the sleeve members and/or the conductor insulation.

Another object of the invention is to provide a splice with the use of a splice separator which has detent surfaces which extend not farther than 180 degrees whereby conductors may be readily and easily received therein.

Another object of the invention is to provide a splice which includes sleeve members received in detent surfaces in a separator wherein tape utilized to tape the splice contacts both the separator and a portion of the sleeve members to prevent movement of the same relative to each other.

Another object of the invention is to provide a splice separator which has detent surfaces which include not more than over half of a cylindrical surface which has a larger radius or diameter than that of a sleeve to be received therein.

Another object of the invention is to provide a splice for two two-wire cables wherein the cable insulation is of a figure 8 configuration and the insulation has a larger major cross sectional dimension than the diameter of a connecting sleeve member.

Another object of the invention is to provide a splice for two two-wire cables wherein the cable insulation is of an oval configuration and the insulation has a slightly larger major cross sectional dimension than the diameter of a connecting sleeve member.

Another object of the invention is to provide a splice for two two-wire cables wherein the cable insulation is of an oval configuration and the insulation has a smaller major cross sectional dimension than the diameter of a connecting sleeve member.

Another object of the invention is to provide a splice separator which can be pushed in a generally normal or transverse direction between two sleeve or conducting members or which may be rolled into position.

Another object of the invention is to provide a splice separator which can be easily utilized for use with two wire cables wherein the wires are practically rigid and very difficult to separate.

Another object of the invention is to provide a splice separator of substantially rigid material which is difficult, if not impossible, to distort substantially by hand.

Another object of the invention is to provide a method of making a splice between the ends of two two-wire conductors which includes utilizing sleeve members to connect respective wires of a pair together and wherein the wires or conductors have an inherent resiliency tending to maintain the sleeve members a separated distance apart and as a result, when a splice separator with detent surfaces on the sides thereof is positioned between the sleeve members, the sleeve members move into the detent surfaces.

Other objects and a fuller understanding of this invention may be had by referring to the following description and claims, taken in conjunction with the accompanying drawings, in which:

Figures 1, 2, 3, 4, 5, 7, 8:
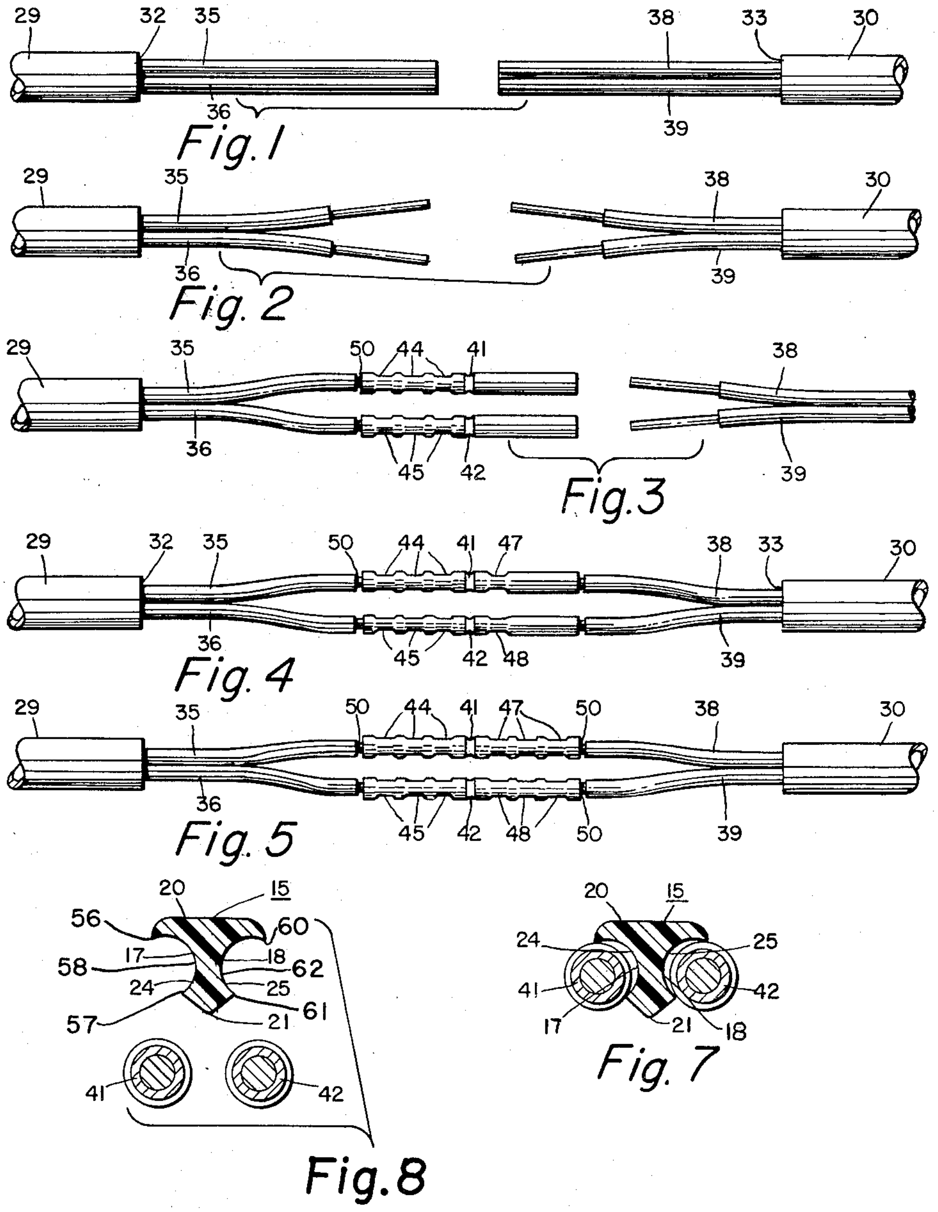
FIGURE 1 is a view showing two two-wire cables with the cable insulation removed from the conductors a predetermined distance.
FIGURE 2 is a view showing the individual conductor insulation removed or skinned from the end of each wire a predetermined distance.
FIGURE 3 shows sleeve members attached to the ends of the conductors in the cable at the left and with the conductors of the cables on the right as yet unattached.
FIGURE 4 is a view showing the conductors of the cable on the right as inserted in the sleeves.
FIGURE 5 shows the conductors of each cable as completely attached.
FIGURE 7 is taken generally along the line 7—7 of FIGURE 6.
FIGURE 8 is a view similar to FIGURE 7 but showing the splice separator before it is in place.
Figures 11, 12, 13, 14, 15:
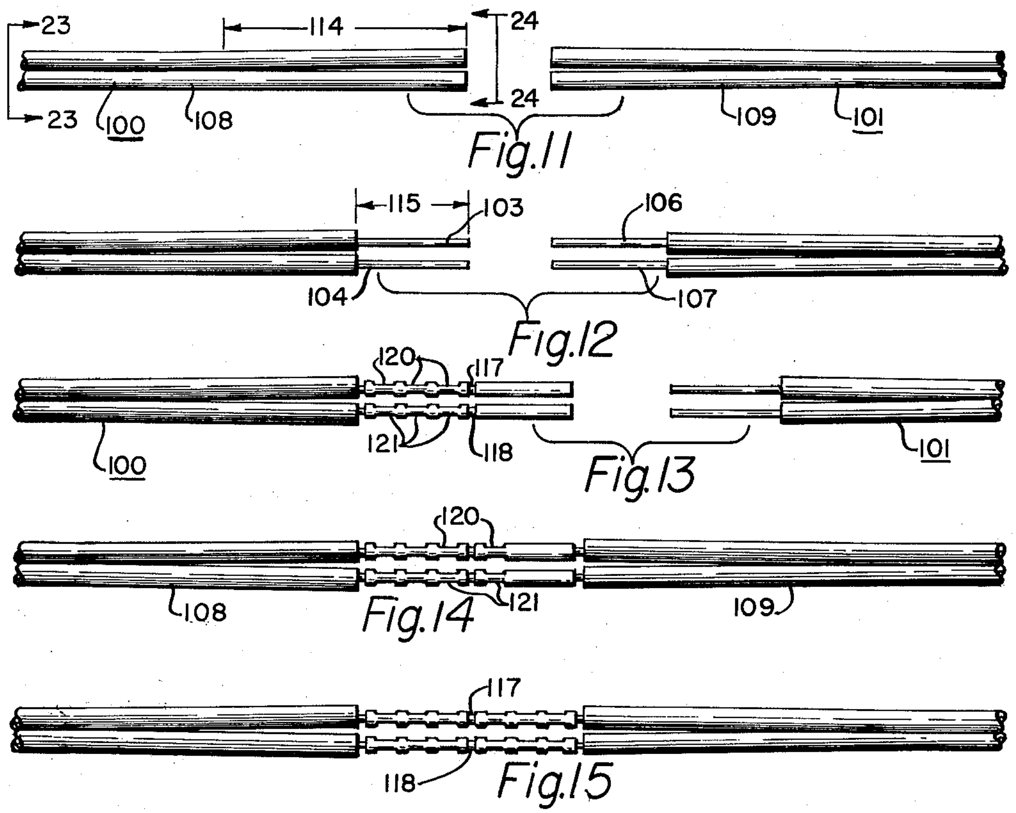
FIGURES 11–15 are views similar to FIGURES 1–5 showing two two-solid wire cables or pair in the various stages of connecting the corresponding wires of each pair or cable together.
Figures 17, 18, 19:
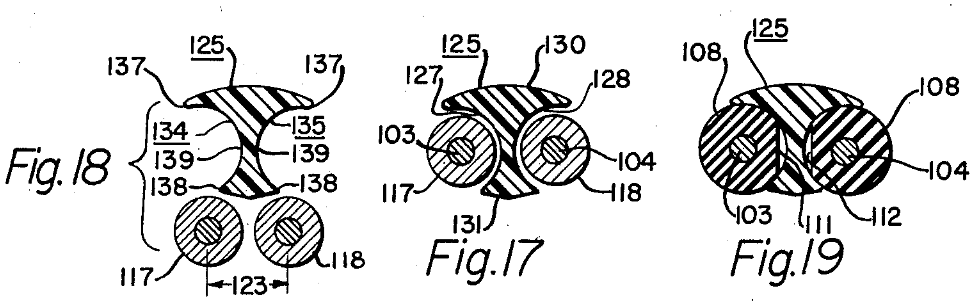
FIGURE 17 is a view taken generally along line 17—17 of FIGURE 16.
FIGURE 18 is a view similar to FIGURE 17 but before the splice separator is located in place between the first and second sleeve members.
Figure 16:
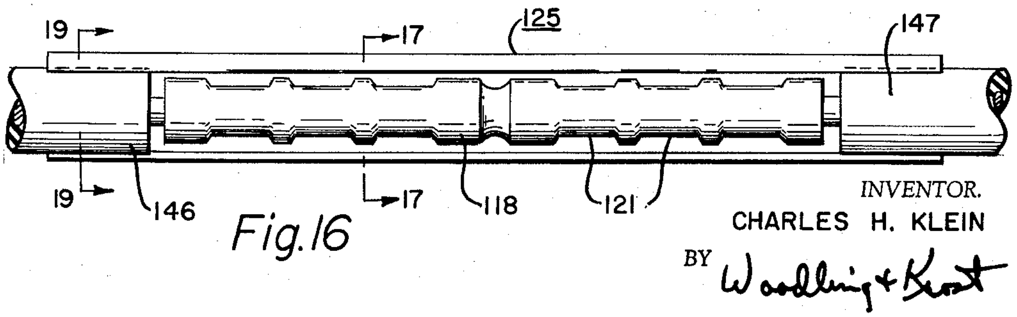
FIGURE 16 is an enlarged view of FIGURE 15 taken 90 degrees from the position of FIGURE 15 and showing the splice separator of the present invention in position.
Figure 20:
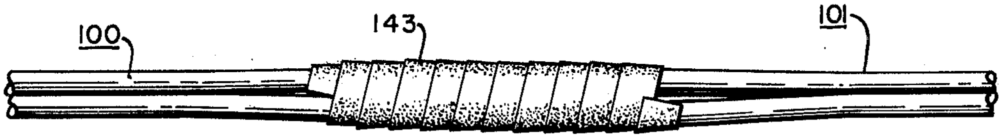
Figure 21:
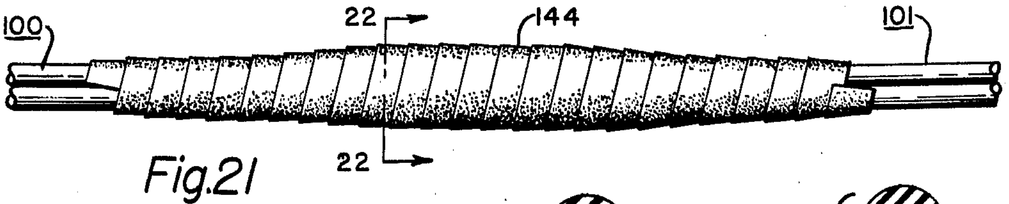
Figure 22:
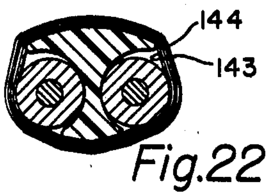
Figure 23:
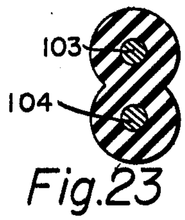
Figure 24:
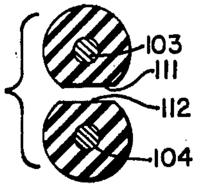
Figures 25, 26, 27, 28, 29:
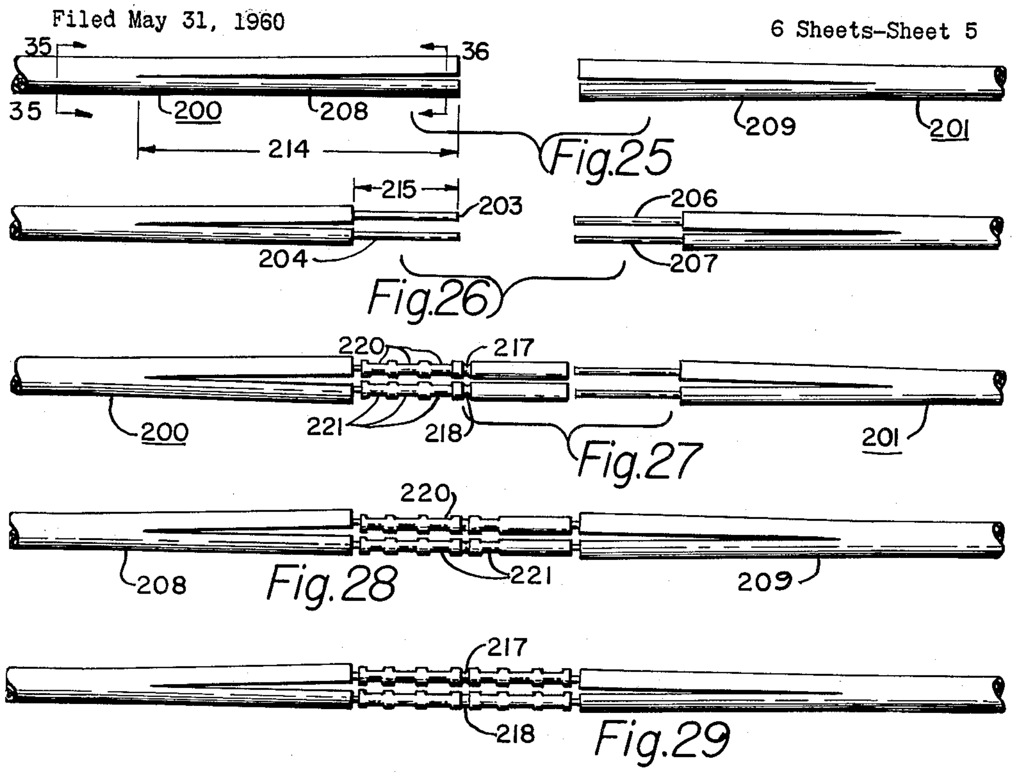
Figures 30, 31, 32, 33, 34, 35, 36:
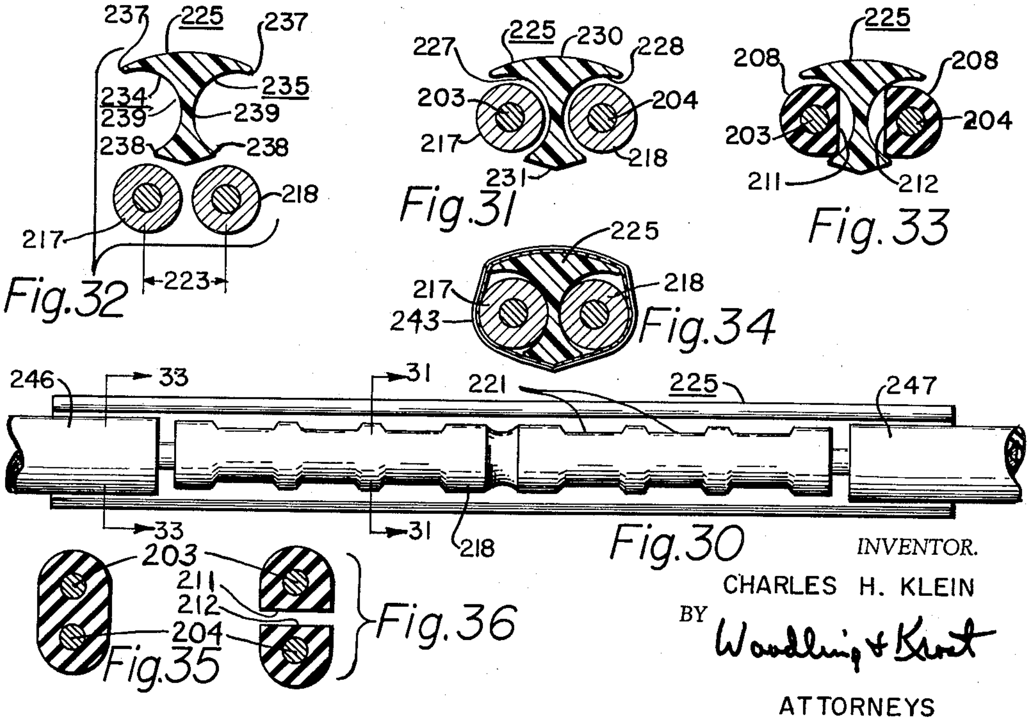
Figure 37:
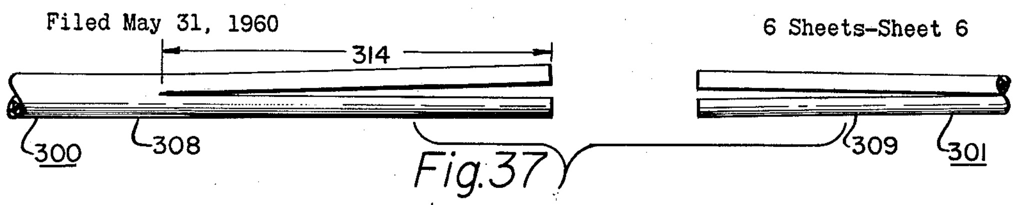
Figure 38:
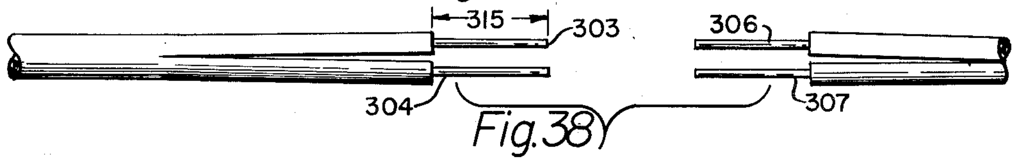
Figure 39:
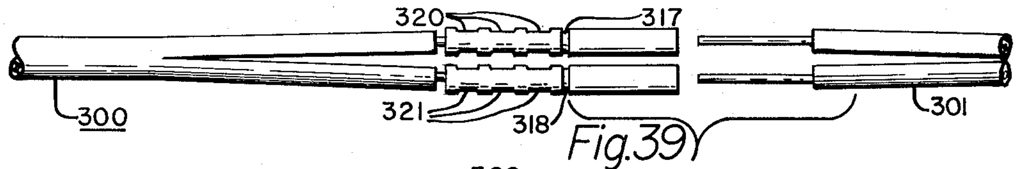
Figure 40:
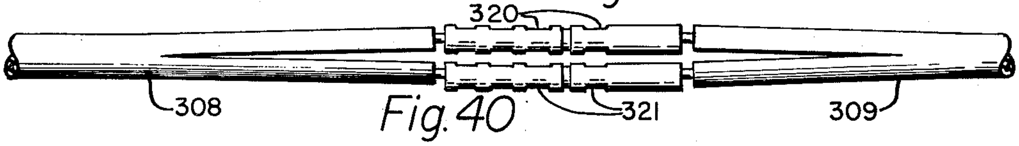
Figure 41:
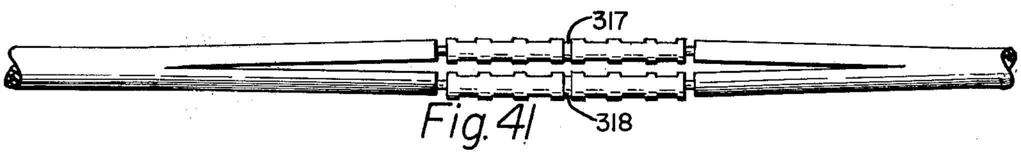

FIGURE 19 is a view taken generally along line 19—19 of FIGURE 16 and as compared with FIGURES 16, 17 and 18, shows that this wire insulation has a larger major dimension than the diameter of the sleeve and that the cable or pair insulation is of a figure 8 construction;

FIGURES 20 and 21 illustrate the taping of the splice separator in position;

FIGURE 22 is a view taken generally along the line 22—22 of FIGURE 21;

FIGURE 23 is a view taken generally along the line 23—23 of FIGURE 11;

FIGURE 24 is a view taken generally along the line 24—24 of FIGURE 11;

FIGURES 25–33 are views similar to FIGURES 11–19 and show another two two-wire cable or pair and with wire insulation having a major dimension only slightly larger than the diameter of the sleeve and with the cable or pair insulation being of a generally oval construction;

FIGURE 34 is a view similar to FIGURE 31 but after the splice separator has been taped in position;

FIGURE 35 is a view taken generally along the line 35—35 of FIGURE 25;

FIGURE 36 is a view taken generally along the line 36—36 of FIGURE 25;

FIGURES 37–45 show still another two two-wire cable or pair and with wire insulation having a major dimension smaller than the diameter of the sleeve and with the cable or pair insulation being of a generally oval construction.

Figure 46:
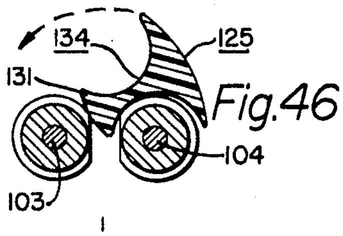
Figure 47:
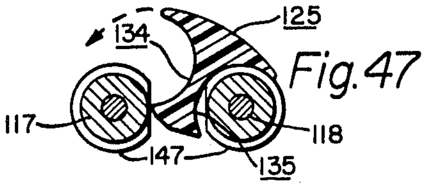
Figure 48:
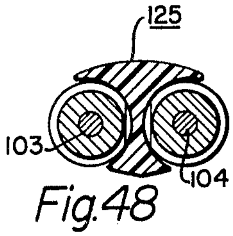
Figure 49:
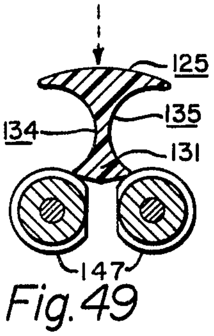
Figure 50:
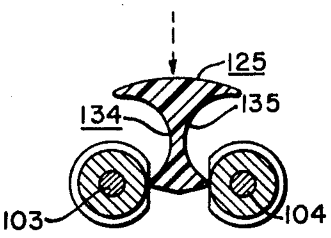
Figure 51:
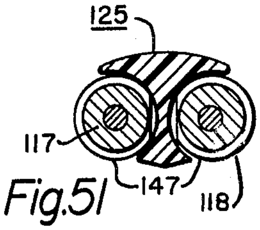

FIGURES 46–48 illustrate the steps of rolling the splice separator of the present invention into place between two sleeve members; and FIGURES 49–51 illustrate the steps of pushing the splice separator between two sleeve members in a direction generally normal or transverse to the extent of the sleeve members.

Figure 6:
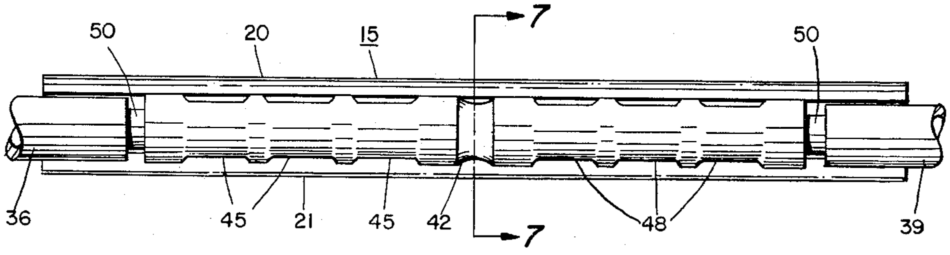
FIGURE 6 is an enlarged view of the splice separator of the present invention in place between the sleeve members which are used to splice the conductors of each cable.

The splice separator of the present invention is best seen in FIGURES 6, 7 and 8 and has been indicated generally by the reference numeral 15. As seen in FIGURE 6 this splice separator is elongated and is constructed of substantially rigid plastic material with the terminology substantially rigid including material within the range of semi-rigid to rigid materials. The splice separator 15 in cross section (FIGURES 7 and 8) is generally wedge shaped and has first and second side portions 17 and 18, respectively, and first and second end portions 20 and 21, respectively. First and second semi-circular walls or arcuate detent surfaces 24 and 25 are provided on the first and second side portions 17 and 18, respectively. The first and second semi-circular walls may also be referred to as first and second arcuate wall means. It will be specifically noted that the first end portion 20 of the splice separator is wider than the second end portion 21 and that the first and second side portions 17 and 18 taper toward each other as they extend toward the second end portion. In the embodiment shown in FIGURES 7 and 8, it will be seen that the first and second side portions or walls actually come together at a point or what might be referred to as substantially a point. This construction better enables the splice separator of the present invention to be inserted by the conductors or wires which have been spliced. The first semi-circular wall or arcuate detent surface 24 is provided with a first entrance portion 56 and a second entrance portion 57 and an intermediate portion 58 therebetween. The second semi-circular wall or arcuate detent surface 25 is provided with a first entrance portion 60 and a second entrance portion 61 and an intermediate portion 62 therebetween. It will be noted that the first entrance portions 56 and 60 are spaced from each other a greater distance than the second entrance portions 57 and 61 are spaced from each other. As best shown in FIGURE 7, the second entrance portions 57 and 61 are spaced apart a greater distance than the normal separated distance between the sleeve members 41 and 42 which will be described hereinafter. The intermediate portions 58 and 62 are spaced apart a distance less than the distance between the first entrance portions 56 and 60 and less than the distance between the second entrance portions 57 and 61. The second end portion 21 of the splice separator between the second entrance portions 57 and 61 comprises a nose portion for the insertion of the insulation member between the first and second sleeve members 41 and 42. It will be noted that the distance between the first and second entrance portions 56 and 57 and the distance between the first and second entrance portions 60 and 61 is great enough whereby when the splice separator is inserted between the sleeve members as shown in FIGURES 7 and 8, the sleeve members will engage the detent surfaces without external urging of any kind and because of the tendency of the conductors to return to the position shown in FIGURE 8.

The method of making the cable splice of the present invention is best seen in the sequence of steps shown in FIGURES 1–10. FIGURE 1 shows first and second two-conductor cables 29 and 30, respectively, which have the cable insulation, removed back to a point indicated on the two cables respectively, by reference numerals 32 and 33. This exposes first and second insulated conductors 35 and 36, respectively, in the first cable 29 and first and second conductors 38 and 39, respectively, in the second cable 30. As will be specifically noted, the conductors of each cable are cut off square with each other. FIGURE 2 illustrates the next step in the method of making the cable splice and this comprises removing the insulation from the ends of each of the insulated conductors. The insulation is for the sake of example, only preferably removed on the order of a distance of ⅝ of an inch. FIGURE 3 illustrates the next step and this amounts to the utilization of first and second sleeve members 41 and 42, respectively. The bared end of conductor 35 is inserted into the end of the first sleeve member 41 and the metal sleeve is crimped in or pressed about the bared end of conductor 35 in three places, for example, as at 44. The same procedure is followed with sleeve member 42 and the bared end of conductor 36. The crimping or pressing in this instance has been indicated by the reference numeral 45. FIGURE 4 shows the bared ends of conductors 38 and 39, respectively, inserted into the opposite ends of sleeve members 41 and 42, respectively. The end of the sleeve member 41 within which conductor 38 resides is then crimped as at 47 and sleeve member 42 is crimped as at 48. These crimps or presses are made toward the center of the sleeve and this locks the wires or conductors at equal lengths. The splicing or joining of the conductors is then completed by making two additional crimps 47 on sleeve member 41 and two additional crimps 48 on sleeve member 42.

Figure 9:
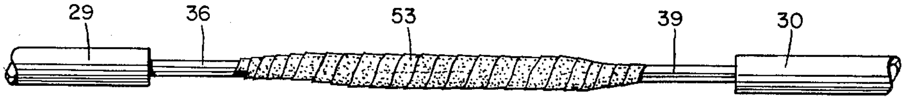
FIGURE 9 is a view showing the splice separator as held in place by a first piece of tape.
Figure 10:
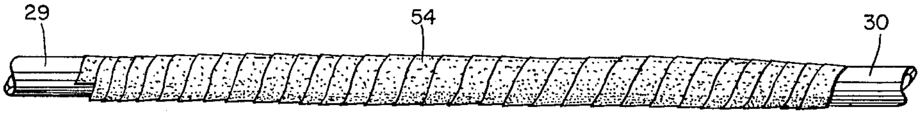
FIGURE 10 shows the completed splice with a second piece of tape covering the splice from the place where the cable insulation has been removed from each cable.

The next step in the making of the cable splice of the present invention is to move the splice separator of the present invention into the position shown in FIGURE 8. It will be noted that in this position that the second end portion 21 of the splice separator or the point of the wedge shape is in position to be pushed between the sleeve members 41 and 42, respectively, which have been used to join the respective conductors of the two cables. The splice separator is pushed between the two sleeve members and assumes the position shown in FIGURE 7. It will be noted that the position of the first and second sleeve members and the conductors are spaced substantially the same distance apart in both FIGURES 8 and 7. The splice separator is maintained from falling through between the two sleeve members and conductors by means of the first end portion 20 which in combination with the semi-circular wall means defines somewhat of a T-shape. With the use of the splice separator of the present invention there is no need of reverse bending the conductors in order to get them to assume their position with respect to the semi-circular wall means. As seen in FIGURE 6, the longitudinal length of the splice separator is greater than the overall length of the sleeve members 41 and 42, respectively. With this construction, the splice separator acts as a splint being longer than the sleeves which protect the shortened section of denuded wire at the entrance of each of the sleeves. These short sections of denuded wire at the entrance of each of the sleeves have all been indicated by the reference numeral 50. Experience has taught that in these short sections because of the inflexibility of the insulated wire and sleeve members that all of the bending is forced to the junction of the bare flexible wire and the sleeve. If any bending must be done, then this short denuded section allows for any easy bend. If the stiffening insulation around each of the conductors is in contact with the rigid sleeve, then there is formed a stress raiser by concentrating the bending to the infinitely small length of denuded wire at the junction 50. This small section is often nicked in skinning the insulation from the wire thus increasing the hazard in the event a repairman bends the same. As a result, the splice separator acts as a splint. The next step is shown in FIGURE 9 and here a short first piece of tape 53 is wound around the outside of the first and second joined conductors and the splice separator to hold these components in place with respect to each other. After this is accomplished the cable splice is completed by utilizing a second piece of tape 54 which extends at least from points 32 to 33 or in other words, the entire length of all the cable insulation which has been removed.

It will also be specifically noted that the splice separator of the present invention is shorter than the distance between the removed cable insulation and this along with the fact that the first end portion is narrower than the second end portion enables the splice separator to be more readily put into place without violent bending of the wires or conductors and without any reverse bending of the same. It will thus be seen that with the teachings of the present invention and with the use of the splice separator herein taught, it is not necessary to tape each individually spliced wire nor is it necessary to stagger the splices to obviate a bulky splice. There is also little or no trouble in getting the splice separator into place between the wires, and as mentioned hereinabove, no trouble with bending or reverse bending is incurred. The new and novel splice separator is reliable in operation and its manufacture is quite economical. Although the drawings have shown and the description has described a braid type of insulation, it will be readily recognized that plastic and/or rubber insulation may also be utilized.

FIGURES 11–24 illustrate a modified form of the splice and splice separator of the present invention and as will be noted in these figures, the splice is between the ends of first and second pairs of conductors indicated by the reference numerals 100 and 101, respectively. The first pair of conductors 100 comprise only first and second, generally side by side solid wire conductors 103 and 104 and the second pair of conductors 101 comprise solid wire conductors 106 and 107, respectively. Conductors 103 and 104 are provided with insulation 108 which extends completely thereabout and in cross section describes generally a figure 8 construction (FIGURES 23 and 24). Conductors 106 and 107 are also provided with insulation 109 which extends completely therearound and describes the same cross sectional configuration. The insulation between the conductors 103 and 104 as well as the insulation between conductors 106 and 107 is separated by cutting the same with a knife or other suitable means and this separates the conductors of each pair for what may be referred to as a first longitudinal distance from the ends thereof. This first longitudinal distance has been indicated by the reference numeral 114. The cutting or separation of the insulation between the conductors of each pair provides first and second opposed flat surface portions 111 and 112 on facing sides of the insulation of each of the first and second conductors. As will be noted, particularly from FIGURES 11 and 12, the insulation around the first and second conductors of each pair is completely removed to bare the first and second conductors of each pair a second longitudinal distance indicated by the reference numeral 115, from the ends thereof and this second distance is less than the first longitudinal distance.

The bared ends of the first conductors of each pair are connected together by inserting the same into the opposed ends of a first sleeve member 117 and the sleeve member is then crimped as at 120 to fixedly secure the sleeve member to the conductors and as a result, the conductors to each other. The second conductors of each pair are secured together in a similar manner by a second sleeve member 118 which is crimped as at 121. The first and second sleeve members 117 and 118 are normally located a separated lateral distance apart after connecting the conductors together and the inherent resiliency of the solid wire conductors tends to maintain the sleeve members, this separated lateral distance apart. The separated lateral distance has been indicated by the reference numeral 123 and is best seen in FIGURE 18. As best seen in FIGURES 17, 18 and 19, the sleeve members are circular or cylindrical in shape and have a first diameter and the insulation of the first and second conductors is also substantially circular with the exception of the flat surface portions 111 and 112 and the insulation of each conductor has a major cross sectional dimension which may also be referred to as a diameter which is larger or greater than the aforementioned first diameter of the sleeve members.

FIGURES 16–19 and 22 best show the substantially rigid splice separator 125 of the present invention as it functions in the splice of the present invention. The splice separator is preferably made of a plastic insulating material and is of such rigidity that it is difficult for a person to deform by hand. The splice separator comprises an insulation member which in cross section is generally wedge shaped and which has only first and second side portions 127 and 128 and first and second end portions 130 and 131, respectively, (FIGURE 17). First and second engaging arcuate detent surfaces 134 and 135 (FIGURE 18) are formed, respectively, on the first and second side portions 127 and 128 and are substantially semi-circular or semi-cylindrical in nature. These arcuate detent surfaces extend longitudinally of the insulation member and it may also be said that the arcuate detent surfaces comprise surface means which do not extend arcuately farther than 180 degrees. Each of the engaging arcuate detent surfaces has first and second entrance portions 137 and 138 with an intermediate portion 139 therebetween. The first entrance portions of the detent surfaces are spaced from each other a greater distance than the second entrance portions 138 are spaced from each other and the second entrance portions are spaced apart a distance greater than the separated lateral distance 123 between the first and second sleeve members but are not spaced apart a great enough distance to permanently bend the first and second conductors when the second end portion 131 is placed or pushed between the two sleeve members. It will also be noted that the intermediate portions 139 of the two detent surfaces are spaced apart a distance less than the distance between the first entrance portions and less than the distance between the two second entrance portions.

The distance between the first and second entrance portions 137 and 138 of each detent surface 134 and 135 is greater than the first diameter of the sleeves (FIGURE 17) and is also greater than the major cross sectional dimension of the insulation of each of the first and second conductors (FIGURE 19) and as a result, when the splice separator 125 is moved from the position shown in FIGURE 18, by pushing on the same in a direction transverse to or at right angles to the extent of the sleeve members into the position shown in FIGURE 17, the first and second sleeve members 117 and 118 are completely received in the first and second engaging arcuate detent surfaces 134 and 135 as well as portions 146 and 147 (FIGURE 16) of the insulation 108 and 109 which extend beyond the axial extent of the first and second sleeve members. It will be noted in FIGURE 17 that the sleeve members are not in engagement with the arcuate detent surfaces whereas in FIGURE 22 they are in engagement. The reason for this is that they are prevented from returning to their exact separated lateral distance apart 123 because the portions 146 and 147 of the insulation 108 and 109 which extend beyond the axial extent of the sleeves are of a larger diameter and maintain the sleeves in this position. FIGURE 20 shows a first layer of tape 143 applied to at least the axial extent of the splice separator and FIGURE 21 shows a second layer of tape 144 applied to the entire length of the splice, or in other words, which extends slightly farther than the combined first longitudinal distance 114 of each pair of conductors. FIGURE 22 is a cross sectional view through FIGURE 21 and illustrates how the tape engages a goodly portion of the circumference of the sleeve members as well as engaging the splice separator to hold all of these elements with respect to each other.

FIGURES 25 through 36 illustrate a further modified form of the splice of the present invention. In FIGURES 25–36 similar elements have been indicated with reference numerals 100 digits higher than in the modification of the invention shown in FIGURES 11–24. In this embodiment of the invention, it will be noted that the conductors 203 and 204 of a first pair 200 are connected to the conductors 206 and 207 of a second pair by means of sleeve members 217 and 218, respectively. These sleeve members are crimped as at 220 and 221 and the sleeve members are separated after connecting the conductors a separated lateral distance apart 223. A rigid splice separator 225 is provided with engaging arcuate detent surfaces 234 and 235 each of which has first and second entrance portions and an intermediate portion 237—239, respectively.

FIGURES 33, 35, and 36 indicate that the insulation 208 and 209 around the first and second pair 200 and 201 forms a generally oval configuration and the insulation around each individual conductor after the insulation has been split or separated has a major cross sectional dimension or diameter which is substantially equal to or slightly larger than the diameter of the sleeve members. The splice separator 225 is moved into assembled position from the disassembled position shown in FIGURE 32 by exerting a force on the first end portion 230 thereof and in a direction transverse to the extent of the sleeve members. This causes the second end portion 231 to move the sleeves apart and when the sleeves and the insulation are aligned with the detent surface, they assume the position shown in FIGURES 31 and 33. The insulation around each of the conductors (FIGURE 33) keeps the sleeve members from resuming exactly their position shown in FIGURE 32. FIGURE 34 illustrates the position of the sleeve members in engagement with the arcuate detent surfaces after the first layer of tape 243 has been applied thereto. A second layer of tape is later applied as in FIGURE 21. It will be noted in this modification that the straight line distance between the first and second entrance portions of each of the arcuate detent surfaces is greater than the major dimension of either the sleeve members or the insulation around each individual conductor. As a result, these are readily received within the arcuate detent surfaces without external urging of any kind.

Figures 43, 44, 45:
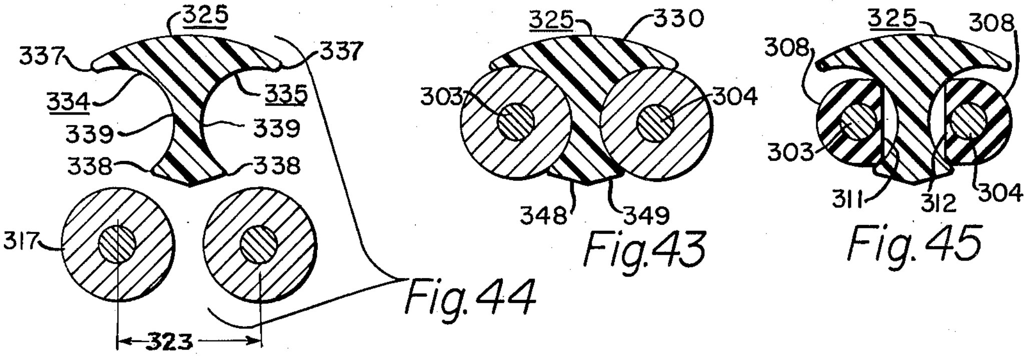
Figure 42:
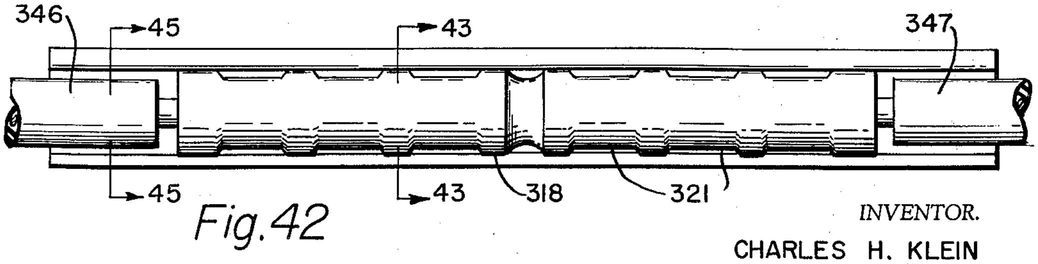

FIGURES 37–45 show a still further modification of the invention disclosed herein and identifying reference numerals 100 digits higher than those used in the discussion of FIGURES 25–36 have been utilized wherein similar structure is used. Accordingly the individual conductors 303 and 304 of a first pair 300 are connected to the individual conductors 306 and 307 of a second pair 301 by means of sleeve members 317 and 318. These sleeve members are crimped as at 320 and 321 and the connected conductors, because of their inherent resiliency, locate the sleeve members a separated lateral distance apart 323. In this modification a rigid splice separator 325 is utilized which has the same configuration as splice separators 125 and 225. The second end portion 331 of the splice separator includes tapered walls 348 and 349 similar to those shown on separators 125 and 225. In this modification, the insulation 308 and 309 which extends around the first and second pair 300 and 301 forms a generally oval construction as seen in FIGURE 45. The sleeve members 317 and 318 have larger diameters than the diameter or the major cross sectional dimension of the insulation around each individual conductor after the insulation has been split. This can be observed from viewing FIGURES 43 and 45. The distance between the first and second entrance portions 337 and 338; however, is greater than either the cross sectional dimension of the sleeves or of the insulation and as a result these are readily received in the engaging arcuate detent surfaces 334 and 335 when the splice separator 325 is pushed between the sleeves. The splice is taped in the same manner as the splice is taped in FIGURES 20 and 21.

FIGURES 46–48 illustrate another method of positioning or inserting the splice separator shown in FIGURES 16–19 between the sleeve members 117 and 118. FIGURES 49–51 are a comparison of the method disclosed hereinbefore of inserting or positioning the splice separator between the sleeve members in a direction generally transverse to the extent of the sleeve members. The method disclosed in FIGURES 46–48 includes the steps of placing the second arcuate detent surface 135 on or into engagement with the insulation portions 146 and 147 of the second conductors 104 with the second end portion 131 of the splice separator in engagement with the insulation portions 146 and 147 of the first conductors 103. In the construction (FIGURES 42–45) where the sleeve members are larger than the insulation, the second detent surface is positioned on the second sleeve member rather than on the insulation portion. It will be readily appreciated that the sequence might be started in reverse or in other words, with the first arcuate detent surface 134 in engagement with the insulation portions of the first conductors. The splice separator is then pushed or urged in such a direction as to generally rotate the splice separator about the second conductors which causes the same to be moved into generally the position shown in FIGURE 47. This pushes the sleeve members apart a greater distance than said separated lateral distance 123 and upon further urging, the sleeve members and insulation portions are aligned with the detent surfaces and move into the position shown in FIGURE 48. Tape is then applied to the splice separator and sleeves as well as the insulation portions which are within the axial extent of the splice separator. It will be noted in FIGURES 46–48 that the insulation portions have been shown behind the sleeve members. FIGURES 49–51 illustrate the method of inserting the splice separator between the sleeve members which has been described hereinbefore. This method comprises positioning the separator as shown in FIGURE 49, and then urging or pushing the separator in the direction of the arrow or in other words transverse to the extent of the sleeve members and the splice separator progressively assumes the positions shown in FIGURES 50 and 51.

It will thus be seen that a splice has been provided between the ends of two pair conductors with the use of a splice separator which has detent surfaces with entrance portions large enough to receive connecting sleeve members and/or insulation around conductors without the necessity of externally urging either the sleeve members or the conductor insulation. The detent surfaces shown in the drawings of the present invention extend not greater than 180 degrees whereby conductors are readily and easily received therein which also results in a construction wherein when tape is applied to the splice, it engages both the conductors and the splice separator thereby holding the same in good assembled relationship. The splice and splice separator utilized herein provides a construction for many shapes of cable or wire insulation which includes the figure 8 and oval type of insulation and also wherein the diameter of the connecting sleeves is either smaller or larger or of substantially the same size as the insulation around individual conductors. The splice separator of the present invention can be either rolled into position between two sleeve members and the adjacent insulation portions, or may be pushed between the two in a direction generally transverse to the extent of the sleeve members. Because of the inherent resiliency of the solid wire conductors which are encountered in the practice of the present invention, the connecting sleeve members have a tendency to snap into the detent surfaces or return to their original separated distance, and this is also due to the fact that the openings to the detent surfaces or the distance between the first and second entrance portions is at least as great as the diameter of the connecting sleeve members or adjacent insulation portions.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

This application is a continuation-in-part of my application, Serial No. 766,349, filed October 9, 1958, for Splice Separator, now abandoned.

I claim:

1. A splice between the ends of first and second pairs of conductors, each said first and second pairs of conductors comprising only first and second stiff side by side wire conductors, said first and second conductors of each said first and second pair having insulation therearound which insulates said first and second conductors from each other and secures the same in said side by side relationship, said insulation between said first and second conductors of each said first and second pair being split to separate said first and second conductors a first distance from the ends thereof, said insulation around said first and second conductors of each said first and second pair being completely removed to bare said first and second conductors a second distance from the ends thereof which is less than said first distance, first and second sleeve members, said bared ends of said first conductors of said first and second pair residing in opposed ends of said first sleeve member to secure said first conductors together, said bared ends of said second conductors of said first and second pair residing in opposed ends of said second sleeve member to secure said second conductors together, said first and second conductors having a stiffness that resists separation of said first and second sleeve members beyond a separated distance whereby the conductors remain generally straight, a substantially rigid non-deformable splice separator, said splice separator consisting of an elongated insulation member in cross section having only first and second side portions and first and second end portions, first and second arcuate detent surfaces on said first and second side portions, respectively, and extending longitudinally of said insulation member, each said first and second detent surface having a first entrance portion and a second entrance portion and an intermediate portion therebetween, said first entrance portion of said first and second detent surfaces being spaced apart a distance greater than the distance between said second entrance portions, said second entrance portions of said first and second detent surfaces being spaced apart a distance greater than said separated distance between said first and second sleeve members, said intermediate portions of said first and second detent surfaces being spaced apart a distance less than said distance between said first entrance portions and less than said distance between said second entrance portions, said second end portion having a dimension less than said distance between said second entrance portions, said first and second entrance portions and said intermediate portions of said first and second detent surfaces being rigid and fixedly disposed relative to each other, said stiffness of said first and second conductors urging said first and second sleeve members within said first and second detent surfaces, and tape means covering the length of said splice.

2. A splice between the ends of first and second pairs of conductors, each said first and second pairs of conductors comprising only first and second stiff side by side wire conductors, said first and second conductors of each said first and second pair having insulation therearound which insulates said first and second conductors from each other and secures the same in said side by side relationship, said insulation between said first and second conductors of each said first and second pair being split to separate said first and second conductors a first distance from the ends thereof, said insulation around said first and second conductors of each said first and second pair being completely removed to bare said first and second conductors a second distance from the ends thereof which is less than said first distance, first and second sleeve members, said bared ends of said first conductors of said first and second pair residing in opposed ends of said first sleeve member to secure said first conductors together, said bared ends of said second conductors of said first and second pair residing in opposed ends of said second sleeve member to secure said second conductors together, said first and second conductors having a stiffness that resists separation of said first and second sleeve members beyond a separated distance whereby the conductors remain generally straight, a substantially rigid non-deformable splice separator, said splice separator consisting of an elongated insulation member in cross section having first and second side portions and first and second end portions, first and second arcuate detent surfaces on said first and second side portions, respectively, and extending longitudinally of said insulation member, each said arcuate detent surface being located substantially on the arc of a circle, each said first and second detent surface having a first entrance portion and a second entrance portion and an intermediate portion therebetween, said first entrance portion of said first and second detent surfaces being spaced apart a distance greater than the distance between said second entrance portions, said second entrance portions of said first and second detent surfaces being spaced apart a distance greater than said separated distance between said first and second sleeve members, said intermediate portions of said first and second detent surfaces being spaced apart a distance less than said distance between said first entrance portions and less than said distance between said second entrance portions, said second end portion having a dimension less than said distance between said second entrance portions, said first and second entrance portions and said intermediate portions of said first and second detent surfaces being rigid and fixedly disposed relative to each other, said stiffness of said first and second conductors urging said first and second sleeve members within said first and second detent surfaces, said first and second entrance portions of each detent surface being fixedly spaced from each other on said arc of said circle less than 180 degrees, and tape means covering the length of said splice.

References Cited in the file of this patent

UNITED STATES PATENTS

| | | |
|---|---|---|
| 1,852,031 | Steinmayer | Apr. 5, 1932 |
| 2,639,312 | Kerwin | May 19, 1953 |
| 2,901,799 | Chalos | Sept. 1, 1959 |

FOREIGN PATENTS

| | | |
|---|---|---|
| 321,223 | Great Britain | Nov. 4, 1929 |